US012575580B2

(12) United States Patent　　　　　(10) Patent No.:　US 12,575,580 B2
Guinzelli　　　　　　　　　　　　　　(45) Date of Patent: 　　Mar. 17, 2026

(54) POULTRY FOOT CALLUS EXTRACTOR

(71) Applicant: CENOTIC ENGENHARIA LTDA, Sao Jose (BR)

(72) Inventor: Claimir Adolfo Guinzelli, Guaratuba (BR)

(73) Assignee: CENOTIC Engenharia LTDA, Sao Jose (BR)

( * ) Notice: Subject to any disclaimer, the term of this patent is extended or adjusted under 35 U.S.C. 154(b) by 0 days.

(21) Appl. No.: 18/995,132

(22) PCT Filed: Jun. 28, 2023

(86) PCT No.: PCT/BR2023/050220
§ 371 (c)(1),
(2) Date: Jan. 15, 2025

(87) PCT Pub. No.: WO2024/036386
PCT Pub. Date: Feb. 22, 2024

(65) Prior Publication Data
US 2026/0026519 A1　　Jan. 29, 2026

(30) Foreign Application Priority Data
Aug. 17, 2022　(BR) ......................... 102022016322-7

(51) Int. Cl.
*A22C 21/00*　　　　(2006.01)
(52) U.S. Cl.
CPC ...... *A22C 21/0092* (2013.01); *A22C 21/0053* (2013.01); *A22C 21/0061* (2013.01)
(58) Field of Classification Search
CPC ............ A22C 21/0092; A22C 21/0053; A22C 21/0061

USPC .......................................................... 452/86
See application file for complete search history.

(56) References Cited

U.S. PATENT DOCUMENTS

| | | | | |
|---|---|---|---|---|
| 9,673,093 | B2 * | 6/2017 | Hsieh ...................... | H01L 24/11 |
| 2013/0231034 | A1 * | 9/2013 | O'Neil ................... | A22C 17/08 |
| | | | | 452/173 |
| 2014/0302761 | A1 * | 10/2014 | Jefferson ............ | A22C 21/0007 |
| | | | | 452/173 |
| 2016/0021902 | A1 * | 1/2016 | Winkelmolen ........ | A22C 21/06 |
| | | | | 452/183 |

FOREIGN PATENT DOCUMENTS

JP　　　2000158383　A　　6/2000

* cited by examiner

*Primary Examiner* — Richard T Price, Jr.
(74) *Attorney, Agent, or Firm* — LaMorte & Associates, P. C.

(57) ABSTRACT

A machine designed to extract calluses from the footpads of poultry—primarily chickens—comprising a cabinet on the inside of which is mounted a pair of chains between which are mounted a plurality of trays having a circular through-opening in the bottom face thereof. Operatively mounted downstream of the chains is a pair of toothed shafts with motorization means and mounted above this region is a smaller chain which is also motorized. Mounted on said chain is a plurality of assemblies comprised of a base (4) and, mounted thereon, a piston (5), the position of which corresponds to the position of the opening (A) in a tray (B) when the latter is below the region of the smaller chain, wherein the piston (5) and the opening (A) are vertically aligned with each other.

5 Claims, 6 Drawing Sheets

POULTRY FOOT CALLUS EXTRACTOR

FIELD OF THE INVENTION

The present invention proposes a novel electromechanical machine, which is designed to carry out the extraction of fusibilities formed in the plantar pad of the feet of cutting poultry—mainly broilers—already duly slaughtered and cast. Since, the present machine performs the extraction of the shims automatically, requiring collaborators only to feed it with the poultry feet, positioning them properly in the machine. The present machine makes the operation more agile, safe and economic.

DESCRIPTION OF THE STATE OF THE ART

It is known that among many of the diseases that may compromise the birds created for human consumption— mainly the chickens—one of them is Dudo dermatitis, also known as foot-and-foot callus callus, which is a lesion on the plantar cushion, Common at cut-off chickens, created on substrate-substrate used to cover the floor of the compacted and compacted criteria; a disease being caused by the contact of the bird's foot on the bed, The higher the weight and the higher weight deposited on its carcass, the greater is the incidence of foot calli. The occurrence of pododermatitis in poultry is associated with a combination of factors inherent to the bird itself and the environment. The appearance of lesions has been associated: to the diet, to the high density of housing and to handling problems, mainly related to the quality of the field of the aviary, such as type of material and moisture. Since, by considering that the feet of the cutting poultry are also commercialized for consumption, it is found that the feet with dermatitis show a little attractive appearance to the consumer, being preterm, and often discarded, It is desirable to provide some industrial process that makes it possible to enable extraction of the calluses from the feet of the already slaughtered and stored feet—by the use of machines that enable a safe and agile operation.

OBJECTS OF THE INVENTION

In order to solve these drawbacks, the present invention has been developed, which proposes an electromechanical machine, the function of which is to remove the callus (_) from the bird by means of a mechanized rasp. Each bird's foot is manually positioned—by a collaborator on the inside of a small tray provided with an opening at its bottom. A plurality of such trays are mounted on a chain, which performs continuous movement between two sprockets. Thus, each tray carries horizontally a foot until it passes through a toothed shaft, against which said foot is pressed by means of a protruding end of a plunger, thereby causing the rails to be scraped by the friction of that toothed shaft; and in the sequence, the foot drops through a discharge funnel to a conveyor belt, where it is withdrawn to give continuity to its beneficiation. The present machine provides safety and ease of operation and economy, among other advantages.

DESCRIPTION OF THE DRAWINGS

For a better understanding of the present invention, a detailed description thereof is made following, with reference to the accompanying drawings, wherein.

DETAILED DESCRIPTION OF THE INVENTION

Figure 1:
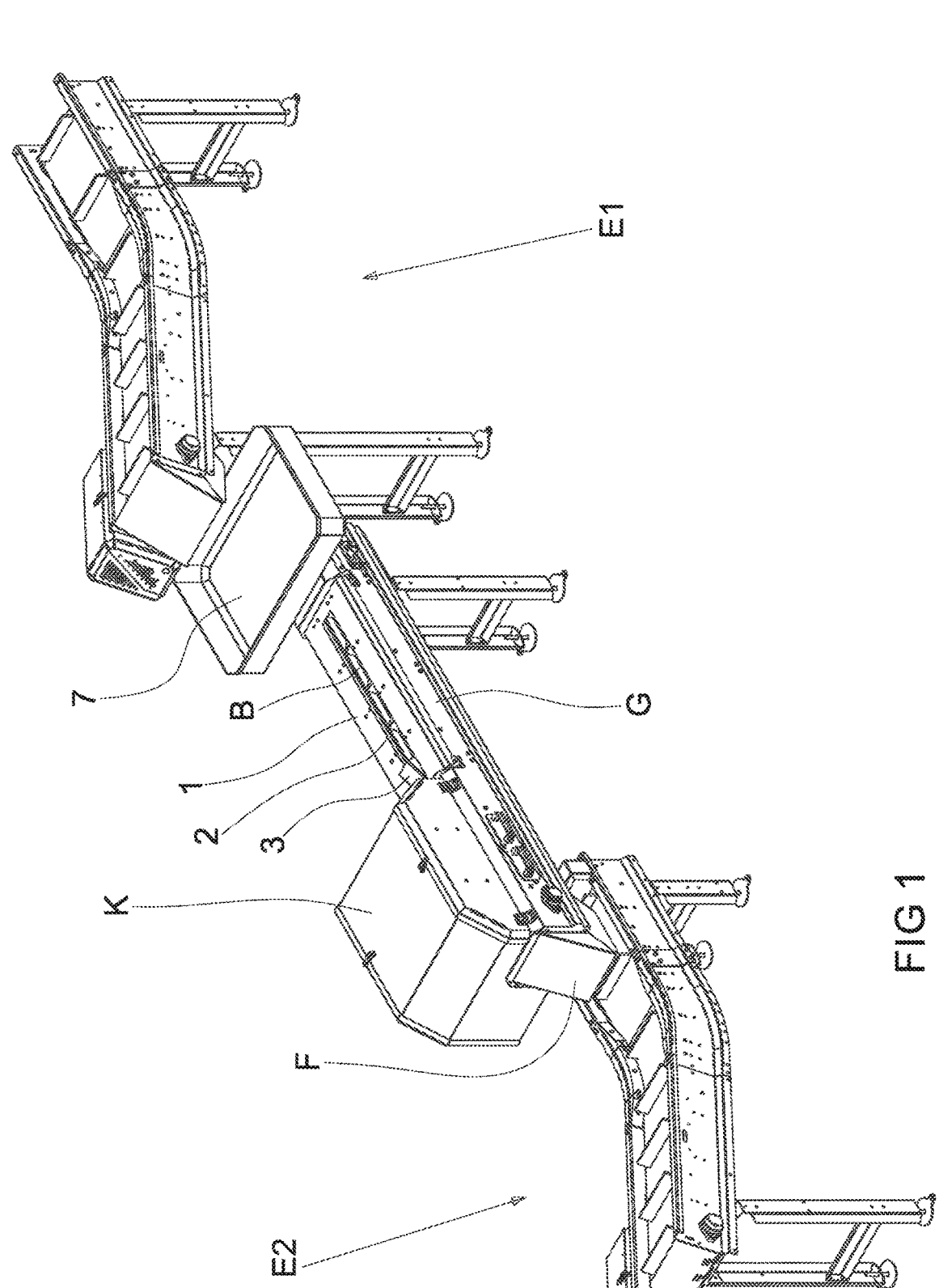
FIG. 1 illustrates the assembled perspective machine, including the representation of the delivery and receiving conveyor belts of the poultry.
Figure 2:
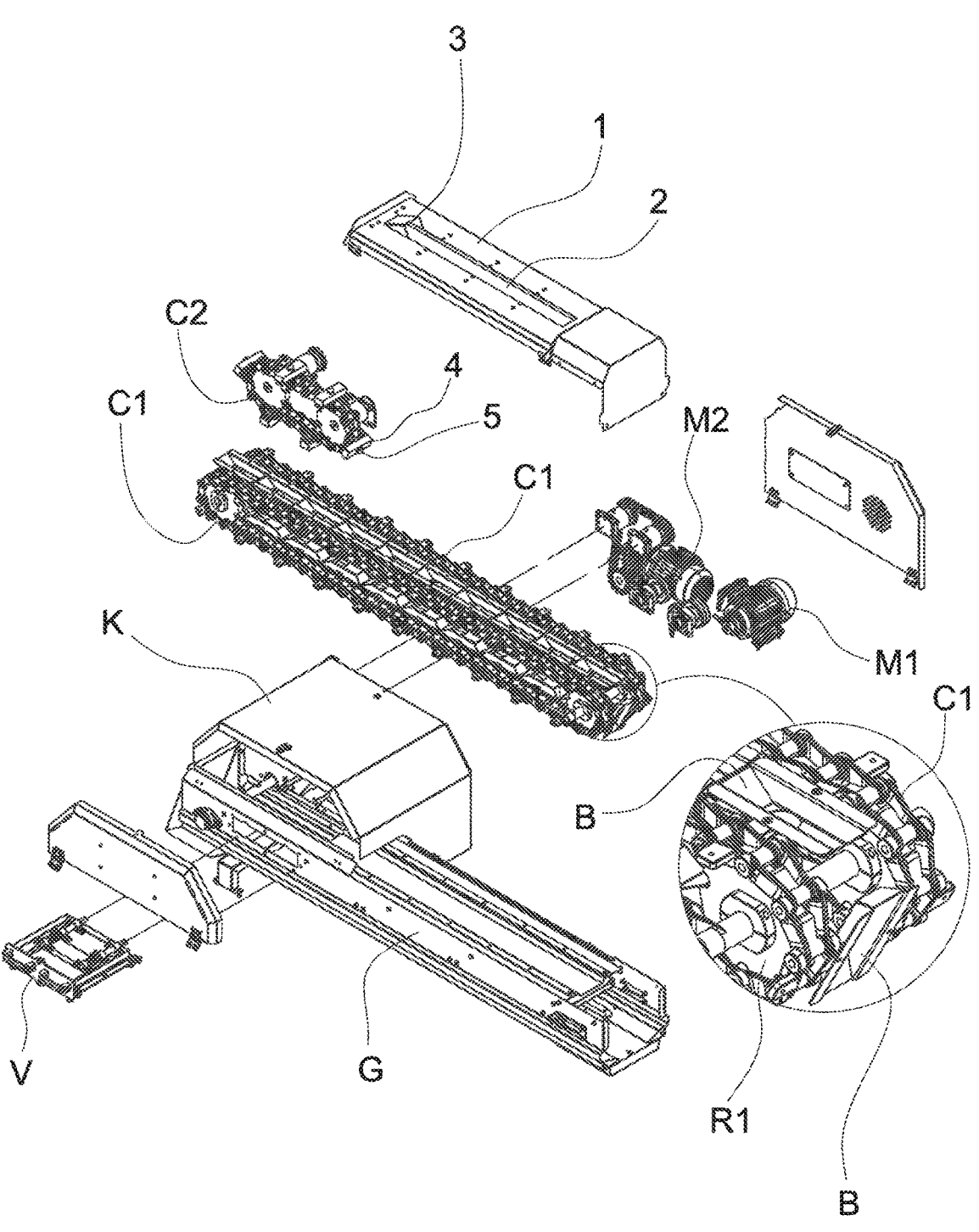
FIG. 2 illustrates the exploded perspective machine.
Figure 3:
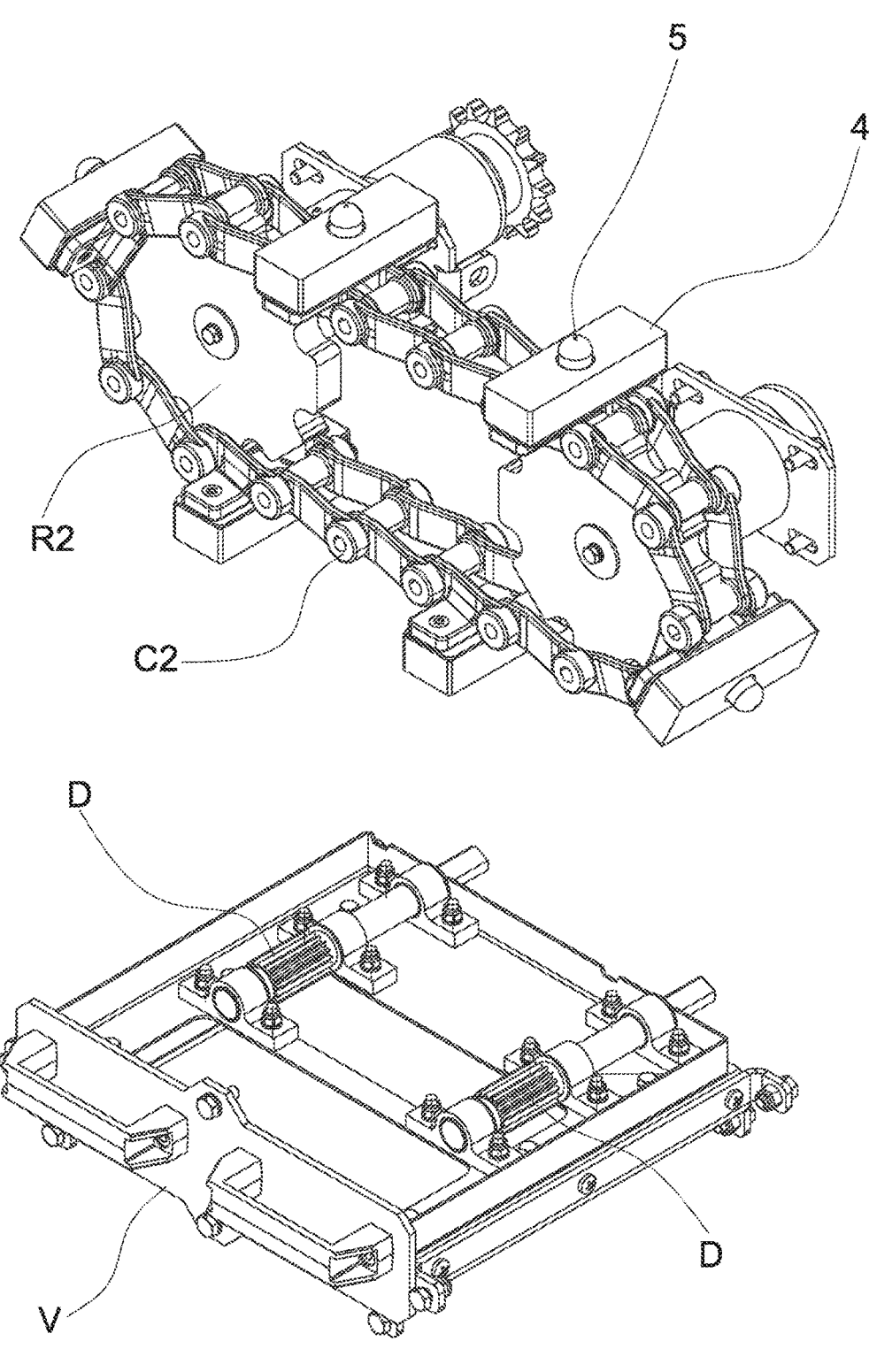
FIG. 3 illustrates in perspective and separately the mechanisms acting directly in callus extraction.
Figure 4:
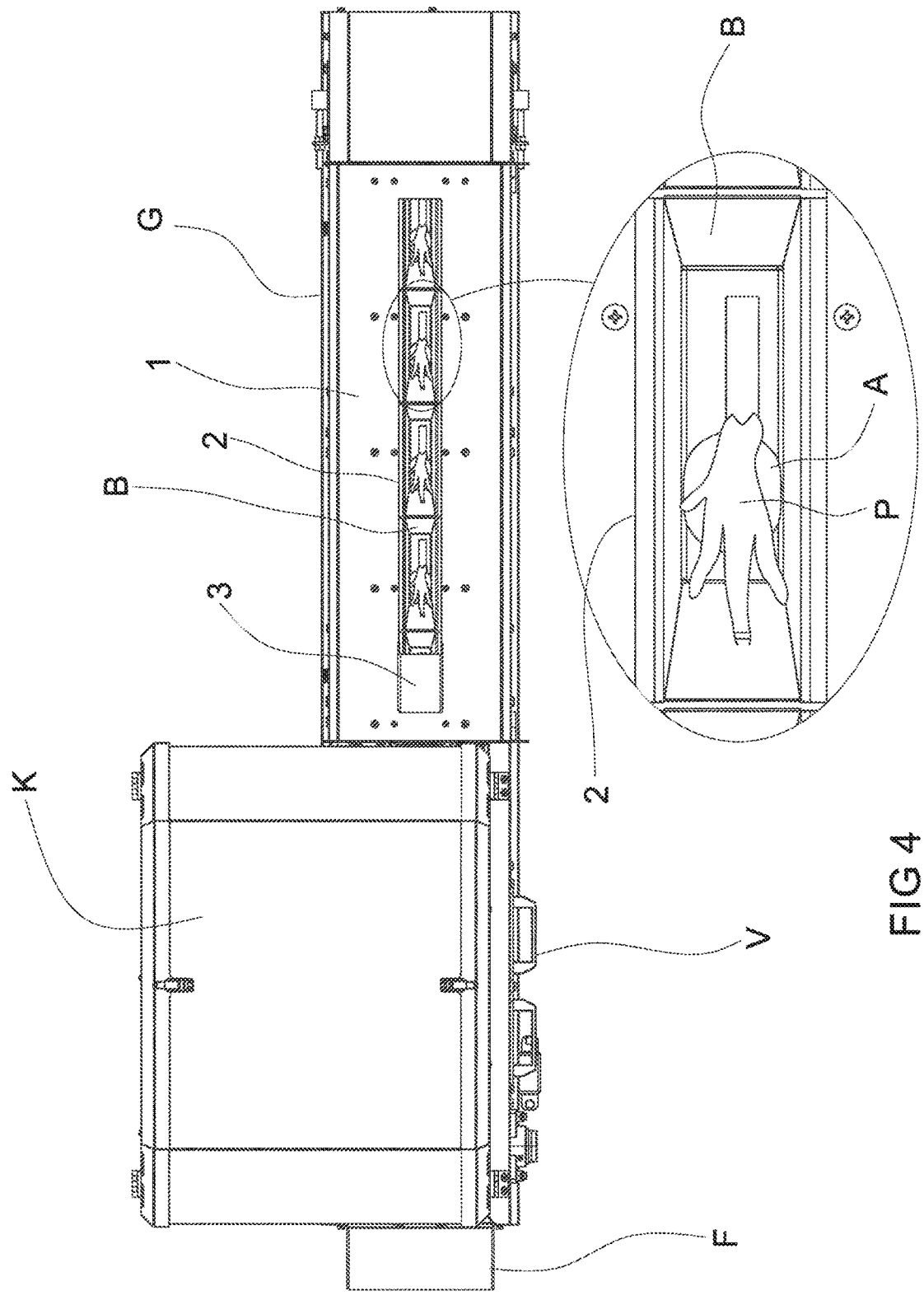
FIG. 4 illustrates the machine in top view.
Figure 5:
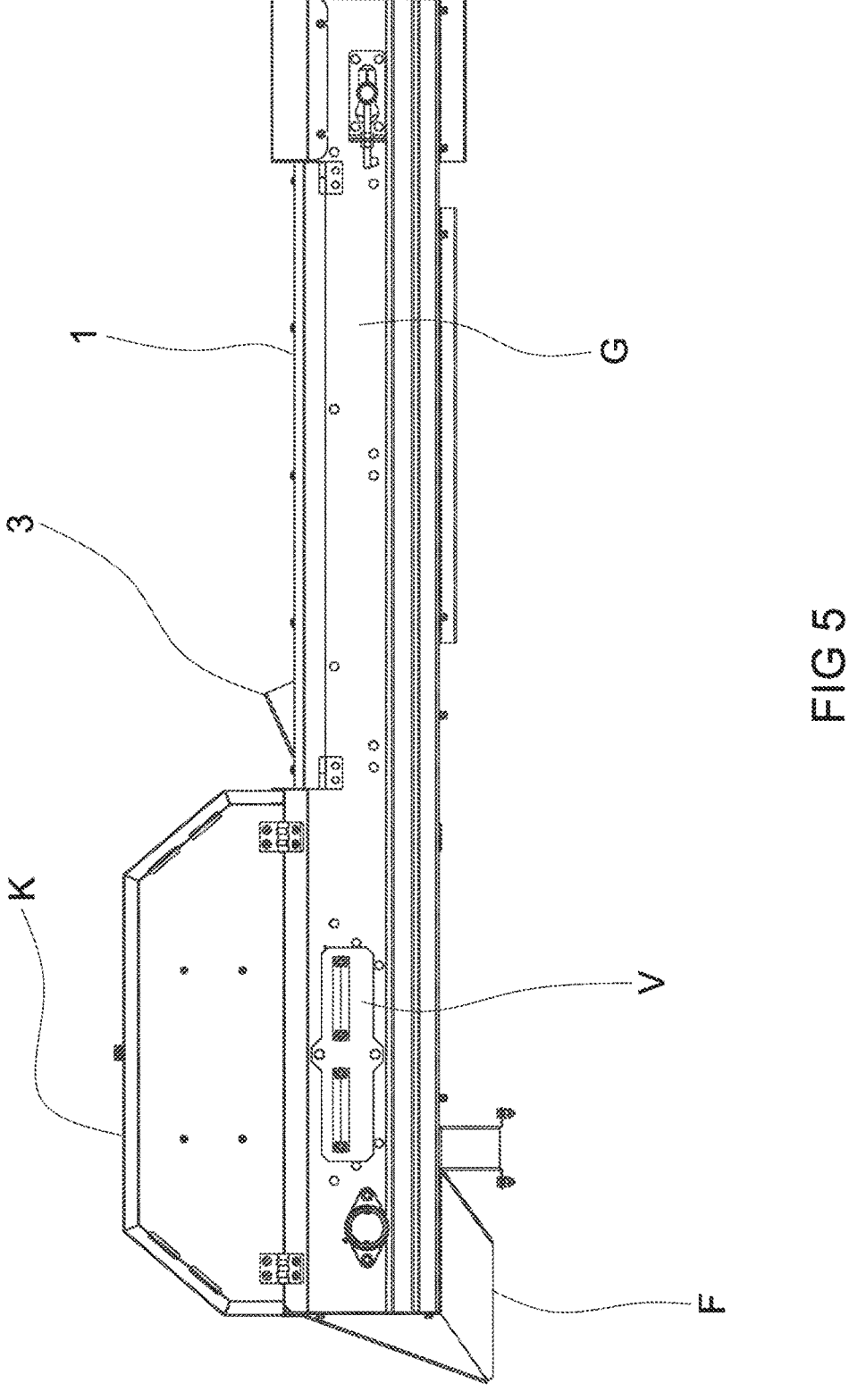
FIG. 5 illustrates the machine side view.
Figure 6:
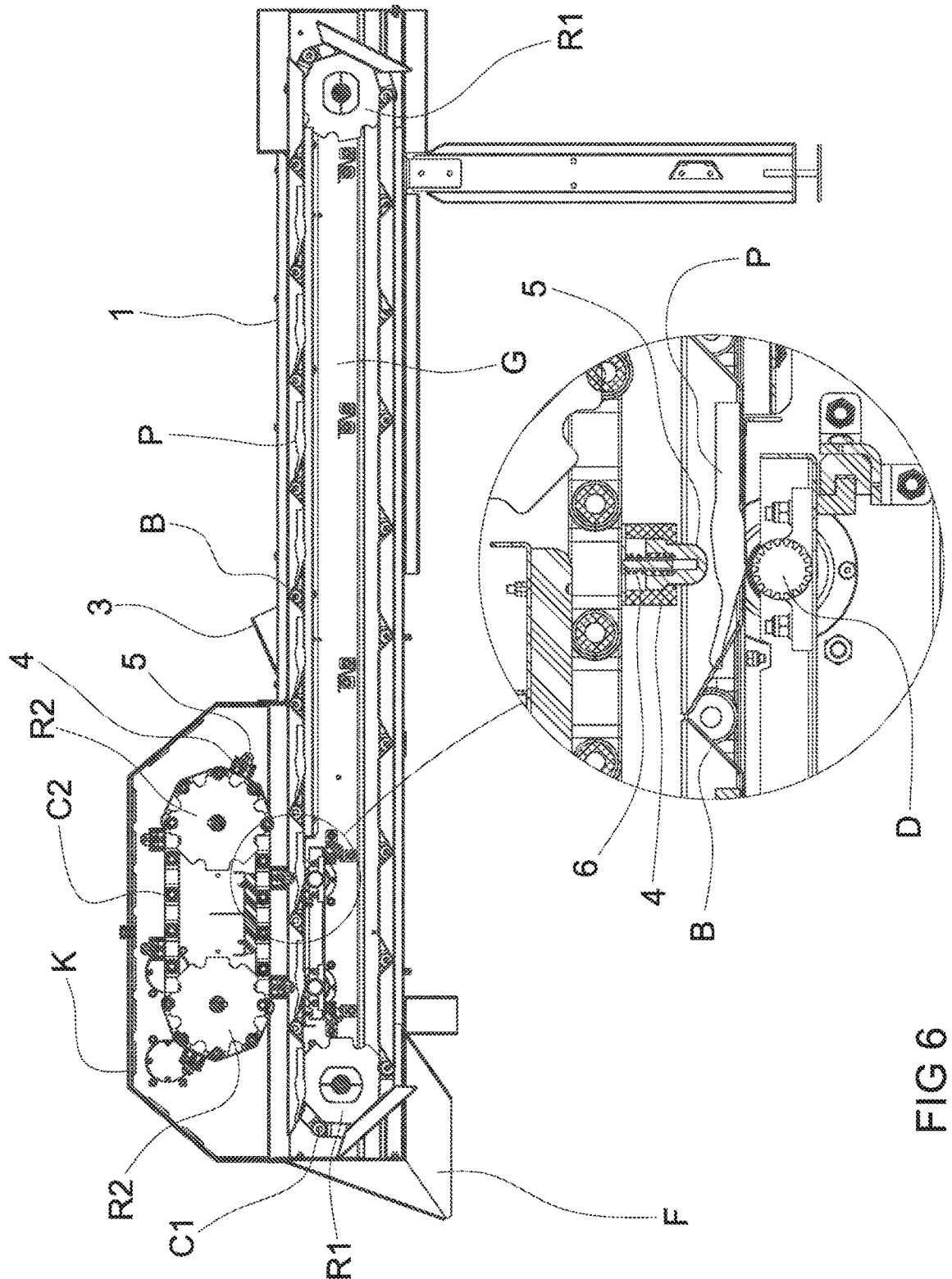
FIG. 6 illustrates the machine in the longitudinal section, revealing the arrangement of its internal elements.

According to these illustrations and their details, the present invention initially comprises a parallelepipedal, longilinear, and horizontal cabinet (G). In the interior of said cabinet (G) there is mounted a pair of chains (C1) arranged parallel to each other, and which are each mounted operatively between two respective sets of sprockets (R1), whose axes are provided with motoring (M1). In the space between the two streams (C1), along its entire length, is mounted between and on the external face of both streams (C1) a plurality of rectangular trays (B), longitudinally aligned and adjacent to each other. Each tray (B) is provided with a circular through opening (A) in its bottom wall. In turn, the upper wall (1) of the cabinet (G) has a rectangular and longitudinal through opening (2), which is positioned precisely on the average region of the chains (C1) and respective trays (B), which thus remain accessible through said opening (2)—a small number of trays (B)—and wherein, On the downstream end of the rectangular opening (2) a tapered deflector mouth (3) is mounted.

In turn, in the downstream region of the chains (C1), between its upper segment and its lower segment, a drawer-shaped structure (V) is mounted, in which is mounted operatively a pair of toothed shafts (D), arranged perpendicularly to the chain (C1) but parallel horizontally to each other and operatively coupled in motoring (M2). In this same region, above the cabinet (G) a fairing (K) is mounted, inside of which is mounted a smaller stream (C2), which is operatively arranged between two sprockets (R2), which are also operatively coupled in that same motor (M2). a plurality of sets formed by a base (4) having a cylindrical cavity are mounted along the outer face of said chain (C2) within which a piston (5) is mounted with a protruding outer end and of a semi-spherical shape, and which is mounted operatively in the cylindrical cavity of said base (4) by means of a compression spring (6); the position of each plunger (5)—when in the lower segment of the smaller stream (C2)—corresponds invariably to the position of the opening (A) of a tray (B), at the time it is under the region of the smaller stream (C2), the piston (5) and the opening (A) being vertically aligned with each other. Finally, downstream of the course of the chains (C1)—at the front end of the machine—an opening into a discharge funnel (F) is arranged.

The operation of the present invention is simple and practical. To operate of the present machine, both motors (M1) and (M2) are driven, concomitantly moving and synchronously both sets of chains (C1) and (C2), respectively; thus causing the trays (B) to move horizontally and linearly downstream—in the upper segment of the chains (C1), performing turns around the circuit of the currents (C1) seamlessly; whereas, the minor current (C2), having its movement synchronized with the currents (C1), It causes the position of each plunger (5) to always match the same position of the aperture (A) of a tray (B), and in this condition it is pointed out that first, Poultry foot (P) arrives at the back of the machine by means of a rear conveyor belt (E1), which is provided with a downstream receiving/accumulator box (7); and thus, a collaborator must manually collect, one by one, the feet (P) of poultry in the receiving/accumulator box (7), and deposit them, one by one, inside one of the trays (B) with the pad plantar downwards and centered over the opening (A) of the tray (B); and in this position, the foot (P) is conveyed along the opening (2) of the cabinet (G), being directed under the tapered deflector mouth (3); and thereafter, reaching over the first toothed shaft (D), where one of the pistons (5) is positioned over the opening (A) of the tray (B), pressing the plantar cushion of the foot (P) against the first toothed shaft (D), when a first step of scraping the heel of the plantar cushion of the foot (P) occurs. In sequence, following the movement of displacement downstream of the upper segment of the chains (C1), the tray (B) reaches the second toothed shaft (D), wherein the protruding piston (5) continues to press the plantar cushion of the foot (P) against the opening (A) of the tray (B), causing the heat to be scraped by this second toothed shaft (D) again, finalizing the scraping of the heel; finally, upon reaching the point most downstream of the current circuit (C1), the foot (P) falls through the discharge funnel (F), being received on a previous conveyor belt (E2), in the following for the next step of its manufacture.

The present invention may have variations of their dimensions, according to specific needs of use. It may also have variation of the geometric shapes of their constituent elements, or also, variation of the materials employed in their construction, provided that the particular and essential characteristics for their realization are maintained.

The invention claimed is:

1. An assembly for cutting callouses from a severed poultry foot, comprising:

a pair of chains arranged in parallel that are moved in unison by at least one drive sprocket, wherein a gap space is disposed between said pair of chains;

a plurality of trays that are disposed in said gap space and are moved by said pair of chains, wherein each of said plurality of trays has an interior sized to retain a severed poultry foot therein, and wherein each of said plurality of trays has a bottom surface with a hole formed therethrough for accessing said interior from below;

a pair of toothed shafts, wherein said plurality of trays are moved past said pair of toothed shafts by said pair of chains, and wherein said pair of toothed shafts are positioned to cut along said bottom surface and past said hole in said bottom surface as said plurality of trays move past said pair of toothed shafts; and a plurality of plungers connected to a looped chain that repeatedly moves said plurality of plungers, wherein at least one of said plurality of plungers moves above said hole in each of said plurality of trays as said trays move over said pair of toothed shafts, wherein should the severed poultry foot be present, said at least one of said plurality of plungers biases the severed poultry foot through said hole and against the pair of toothed shafts as each of said plurality of trays passes over said pair of toothed shafts.

2. The assembly according to claim 1, wherein said plurality of plungers contains internal springs that enable each of said plurality of plungers to partially retract should any of said plurality of plungers contact an object in any of said plurality of trays.

3. The assembly according to claim 1, wherein said pair of chains move said plurality of trays in a looped path that cause said plurality of trays to invert after passing over said pair of toothed shafts.

4. The assembly according to claim 3, further including a funnel positioned to catch any object displaced out of said plurality of trays as said plurality of trays become inverted.

5. The assembly according to claim 1, wherein said pair of toothed shafts are oriented at a perpendicular to said pair of chains.

\* \* \* \* \*